Figure 1:
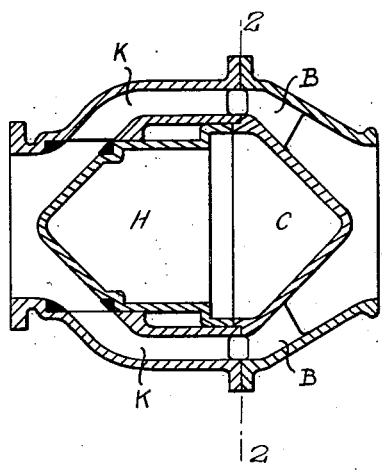

April 27, 1926.                                                1,582,782
O. A. PRICE
COMBINED HYDRAULIC VALVE AND DISPERSAL NOZZLE
Original Filed August 28, 1923

INVENTOR:-
OWEN ALFRED PRICE
by his Attorneys
Howson and Howson

Patented Apr. 27, 1926.

1,582,782

UNITED STATES PATENT OFFICE.

OWEN ALFRED PRICE, OF KILMARNOCK, SCOTLAND.

COMBINED HYDRAULIC VALVE AND DISPERSAL NOZZLE.

Original application filed August 28, 1923, Serial No. 659,807. Divided and this application filed June 10, 1924. Serial No. 719,203.

*To all whom it may concern:*

Be it known that I, OWEN ALFRED PRICE, a British subject, and a resident of Kilmarnock, Scotland, have invented a certain new and useful Combined Hydraulic Valve and Dispersal Nozzle, of which the following is the specification.

This invention has for its object to provide in combination with a valve of known type, means for dispersing and cushioning the destructive energy in high velocity streams of water, and which for instance, exists at the outfall of undersluices or discharge regulators for high dams, or in similar cases where high level water is freely discharged into comparatively shallow river beds, watercourses, reservoirs, penstock chambers, conduit basins, ponds and the like, which means in themselves form the subject-matter of an application filed August 28, 1923, serially numbered 659807 for a United States patent, of which this application is divisional.

According to that concurrent application, means are provided immediately adjacent to the nozzle discharge outlet for the creation of one or more free spiral vortices in the stream immediately before its release to the atmosphere, the means being such that the device may be predeterminedly adapted to the water pressure, its volume and the space available for dispersion, and to this end a nozzle is formed with one or more chambers behind the orifice suitable in shape for the accommodation of a free-spiral-vortex and anterior to this space apparatus is provided to produce a forced-vortex of such a type that it most efficiently initiates that free vortex possessing the desired predetermined properties. The free-vortex condition hereinbefore referred to exists in a fluid flowing axially in a confined space of substantially cylindrical form if it has, combined with the axial component of flow, a tangential component so distributed, across a plane at right angles to the axis, that the said tangential component varies inversely as the radial distance from the axis. The nozzle consists of (1) a divergent conical portion intended to gradually enlarge the area of the stream in order to provide space for the insertion of the blading without constricting the free channel. (2) A blade element consisting of radiating vanes with a central hollow boss from which the vanes radiate. The vanes are shaped so that their pitch or angular disposition, relative to the axis of the nozzle, gradually becomes less as the distance from the axis increases, thereby imparting a greater tangential velocity to the central water than to the water nearer the circumference. It is to be understood however, that the rate of change of pitch of the vanes along the radius may be varied. (3) A part usually convergent and truncated, conical, conoidal, or dome-like providing the space for the consolidation of the natural free vortex and containing a circular outlet orifice in axial line. And (4) a central conoidal boss.

According to the present invention, there is combined in this boss a valve of known form, the boss being so proportioned as to embrace the operating member of that valve.

Figure 2:
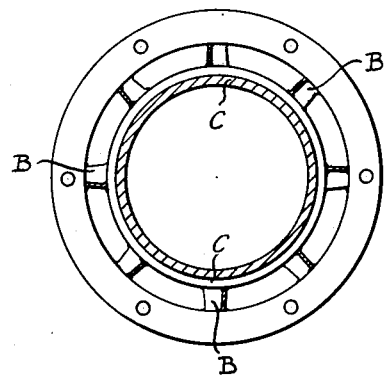

An example of the carrying out of the invention is illustrated in an accompanying sheet of drawings, Figure 1 being a longitudinal sectional elevation and Figure 2 a transverse sectional elevation along the line 2—2 in Figure 1.

In this example, the conoidal central boss C, from which the blades B radiate and which is supported from the casing by webs K, is of such proportions as to embrace the operating member H of the valve. In the example shown in the drawings, I have preferred to show this valve closing in an upstream direction but the direction of closing is obviously not material. The free vortex chamber is the predetermining influence over the behaviour of the apparatus. The forced vortex chamber blades B have angularly disposed faces imparting the necessary tangential velocities to the stream.

The operating member H of the stream-lined valve instead of being of truncated form as shown may be of annular form closing in a similar axial direction to that shown, and working in conjunction with a fixed stream-lined central member.

What I claim is:—

A jet dispersal nozzle comprising in combination, and coaxially arranged, an inlet portion, a blade element consisting of radiating blades whose pitch varies inversely with the radius, adapted to form a forced vortex that will rapidly consolidate to a free spiral vortex, and an outlet portion to accommodate the free spiral vortex, all coacting in such manner that the central portion of the stream is revolved with a higher velocity than the peripheral portion, in combination with a central boss of conoidal stream-lined form associated with said blade element, and a valve within said boss movable longitudinally of the nozzle to open and close the passage through the latter.

In testimony whereof I have signed my name to this specification.

OWEN ALFRED PRICE.